June 28, 1938.  W. J. KATZBERG  2,122,205
COUPLING FOR TUBES
Filed Jan. 27, 1937
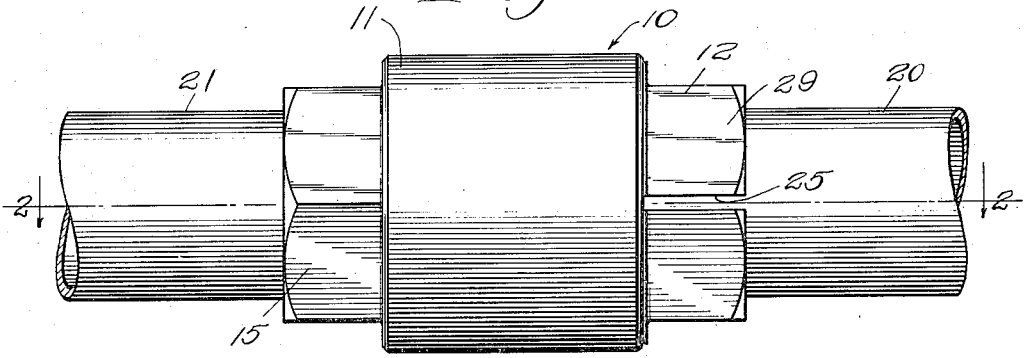
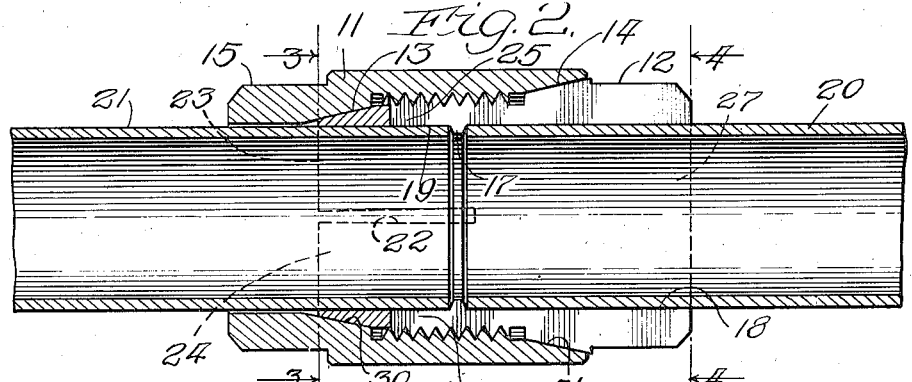
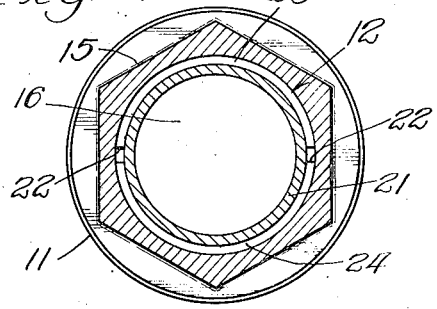
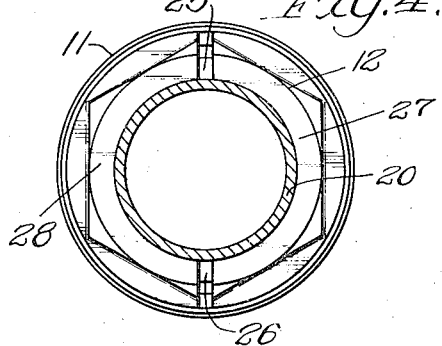
Inventor:
William J. Katzberg,
Attys.

Patented June 28, 1938

2,122,205

UNITED STATES PATENT OFFICE 2,122,205

COUPLING FOR TUBES

William J. Katzberg, Glen Ellyn, Ill., assignor to Harold N. Anderson, Lakewood, Ohio Application January 27, 1937, Serial No. 122,648

8 Claims. (Cl. 285—126)

This invention relates to a coupling for tubes, and more particularly for seamless drawn tubing having relatively thin walls.

One feature of this invention is that it provides means for conveniently coupling a length of conduit tube to another tube; another feature of this invention is that it enables such coupling without threading or other preparation of the ends of the tubes; still another feature of this invention is that it provides a positive gripping action for holding the tubes; yet another feature of this invention is that it automatically compensates for irregularities in tubes and coupling diameters within normal manufacturing tolerances; a further feature of this invention is that no special tools are required for its application or removal; another feature of this invention is that neither the coupling nor the tubes are damaged or permanently deformed in any way and both the coupling and tubes may be connected and disconnected as often as desired; a further feature of this invention is that a two-piece coupling is provided which is adapted to grip a tube at each end thereof upon rotation of one piece with respect to the other; other features and advantages of this invention will be apparent from the following specification and the drawing, in which:

Fig. 1 is a side elevation of a coupling embodying this invention; Fig. 2 is a sectional view along the line 2—2 of Fig. 1; Fig. 3 is a transverse vertical sectional view along the line 3—3 of Fig. 2; and Fig. 4 is a transverse vertical sectional view along the line 4—4 of Fig. 2.

Where the necessity of using more than one pair of wires, or other considerations, renders the use of armored cable undesirable in electrical work, it is customary to use pipe or metal tubing as a conduit and to string insulated wires therein. Such a conduit, of course, requires a coupling at each outlet, switch or fuse box, and the like. In addition, where long distances are traversed between outlets, two or more lengths of pipe must be coupled together. The present conventional practice, when wiring in this manner, is to use relatively heavy pipe as conduit, and to thread the ends for insertion into threaded couplings or openings in outlet boxes. This method is expensive, in that it requires thick walled pipe and a number of threaded joints, and is inconvenient where lengths must be cut and threaded on the job.

The present invention enables the use of thin walled seamless drawn metal tubing of such character that it may be conveniently handled and even bent to avoid certain obstructions without the necessity of angle couplings. The coupling of this invention embodies a socket adapted to receive the ends of the tubes and to frictionally grip them, thereby to lock them in the socket when another compression member is turned up tight. No threading or other preparation of the ends of the pipes or tubes is necessary.

In the particular embodiment of this invention illustrated herewith in Figs. 1 to 4, the coupling 10 comprises two substantially cylindrical pieces 11 and 12. The member 11 is a female sleeve member adapted to receive the male member 12 therein. The member 11 is provided in the center thereof with internal threads which engage corresponding external threads on the male member 12. The external member 11 is a solid sleeve, provided on the inside thereof with a smooth tapered portion 13 at one end and a second smooth tapered portion 14 at the other end. The tapered portion 13 tapers inwardly and downwardly from the threaded portion of the member 11; the portion 14 tapers upwardly and outwardly from said threaded portion. Thus both tapered portions have the same general slope but are located differently with respect to their distance from the center or axis of the sleeve member 11. This member is provided at one end with a polygonal portion 15 adapted to be received by a wrench or other turning tool.

The male member 12 has a substantially cylindrical opening 16 therethrough and a shoulder 17 therein dividing the interior into two sockets 18 and 19. The first socket is adapted to receive a tube 20, and the second a tube 21. These are here illustrated as thin-walled seamless drawn steel tubes. Although about ¾" external diameter, the tube is only of 20-gauge metal.

The inner member 12 has two longitudinal slots 22 extending therein from one end thereof for a considerable portion of its length. These slots are here shown as separated by 180°, and divide the walls of the member 12 at this end into two segments 23 and 24. The presence of these slots enables these segments 23 and 24 to yield inwardly under compression and grippingly engage the tube 21. The other end of the inner or male member 12 also has longitudinal slots extending therein for a considerable distance. These slots are here shown as 25 and 26, separated from each other by 180°, and lying in a plane at right angles to the slots 22; that is, a plane through slots 25 and 26 is here illustrated as vertical, while a plane through slots 22 is here illustrated as horizontal. The slots 25 and 26 extend into the member 12, as here illustrated, further than the inner ends of the slots 22.

The slots 25 and 26 divide their end of member 12 into segments 27 and 28 adapted to yield inwardly under compression and grippingly engage the tube 20. The end is also provided with a polygonal portion 29 adapted to be received by a wrench.

The male member 12 is provided with two smooth tapered portions adapted to cooperate with the frusto-conical portions 13 and 14 of the member 11. These tapered portions are here shown as 30 and 31, respectively. The portion 30 tapers inwardly and downwardly from the threaded portion of the member 12, while the other portion 31 tapers upwardly and outwardly from said threaded portions. The slopes and positions are such as to cooperate with the tapered portions 13 and 14 when the two members are threaded together.

It will be readily seen that a very simple and convenient coupling is provided. The members 11 and 12 are first loosely threaded together, and the tubes 20 and 21 may then be inserted in their respective sockets. A wrench or other tool is then applied to the polygonal portions on each end, and the members are threaded into engagement with each other. As soon as the tapered portions 13 and 30 contact each other, the portions 14 and 31 simultaneously contact, and thereafter rotation of members 11 and 12 causes a wedging action which forces the segments 23 and 24 inwardly to grip the tube 21 and the segments 27 and 28 inwardly to grip the tube 20. Any small differences in tube diameters or the like as a result of manufacturing tolerances, are compensated for by the resilience of the parts and tubes, so that when the members 11 and 12 are drawn up tight it will be found that both tubes are locked in the coupling by a firm gripping engagement of the segments of the inner member 12.

The device provides a coupling which may be conveniently handled in any place where a workman can reach it with a standard wrench. Since the grip is a frictional one, it is not necessary to thread or otherwise prepare the ends of the tubes. In fact, the tubes which are used for conduit work with couplings of this type are preferably so thin walled that threading to an appreciable depth would destroy the ends and cause them to frequently break off at the coupling. Since neither the coupling nor the tubes are permanently deformed by this connection, they may be removed and replaced to repair the wiring, or removed and re-used elsewhere if the conduit is torn down. The fact that seamless drawn metal tubing of relatively thin walled construction may be used, renders the placing of electrical conduits by this means not only more convenient, through the easier handling of the lighter pipe, but much cheaper.

The particular form of coupling illustrated herewith is very simple and convenient. Having only two pieces, one action locks both tubes in place. That is, after the tubes have been inserted in the coupling, one tightening motion of a turn or two by the workman laying the conduit is sufficient to lock both tubes in place and couple them together in a continuous conduit.

The foregoing detailed description is given for clearness of understanding only, and no unnecessary limitations should be understood therefrom, but the appended claims should be construed as broadly as permissible in view of the prior art.

What I claim as new and desire to secure by Letters Patent is:

1. A two-piece coupling for frictionally gripping the ends of each of a pair of thin-walled tubes, including: a female sleeve member; a male member in threaded engagement with said female member, said male member being substantially cylindrical and having an opening therethrough forming sockets adapted to receive a tube at each end, said male member having longitudinal slots extending therein from each end thereof and dividing its walls into segments adapted to yield inwardly; a tapered portion on said male member near each end thereof; and correspondingly tapered portions in said female member adapted to cooperate with said first-mentioned tapered portions, whereby rotation of one of said members with respect to the other forces said segments inwardly to engage the end of each of said tubes.

2. A coupling comprising an inner member and an outer member, the inner member being provided with an external thread intermediate the ends thereof and with frusto conical surfaces adjacent to opposite ends thereof, the said inner member having slots extending longitudinally from opposite ends thereof, the outer member being provided intermediate its ends with an internal thread adapted to engage the external thread of the inner member and being provided at opposite ends thereof with frusto conical surfaces adapted to engage the frusto conical surfaces of the inner member and, by screwing the outer member along the inner member, to contract the corresponding ends of the inner member.

3. A coupling comprising an inner sleeve member adapted to receive within opposite ends thereof the ends of cylindrical objects, the said member being provided with an intermediate external thread and with a frusto conical surface on each side of the said thread and with slots extending from each end thereof toward the opposite end thereof, and an external member having an internal thread intermediate the ends thereof adapted to mesh with the thread of the inner member and having frusto conical surfaces adapted to engage the frusto conical surfaces on the inner member thereby to contract the inner member about the ends of the objects therewithin by advancing the outer member along the threads of the inner member, the inner member being provided with an internal projection intermediate of its ends forming a stop for the ends of the cylindrical objects inserted therewithin.

4. In the coupling claimed in claim 3, the slots from each end of the inner member extending beyond the said projection.

5. In the coupling claimed in claim 2, the slots extending from one end of the inner member being staggered with respect to the slots extending from the opposite end of said inner member and being substantially equi-distantly spaced circumferentially of said member.

6. In the coupling recited in claim 2, the inner member having an internally projecting annular rib intermediate of its ends and the slots provided in one end of the inner member being staggered with respect to the slots provided in the opposite end of the said member and the ends of the slots which are provided in each end of said member extending beyond the ends of the slots which are provided in the opposite end of said member and intersecting said rib.

7. A coupling comprising an inner member and an outer member, the inner member being provided with an external thread intermediate the ends thereof and with frusto conical surfaces adjacent to opposite ends thereof, the said inner member also having slots extending longitudinally from the opposite ends thereof, the outer member being provided intermediate its ends with an internal thread adapted to engage the external thread of the inner member and being provided at opposite ends thereof with frusto conical surfaces adapted to engage the frusto conical surfaces of the inner member and, by screwing the outer member along the inner member, to contract the corresponding ends of the inner member, the slots provided in one end of the inner member being staggered with respect to the slots provided in the opposite end of the said member and the ends of the slots which are provided in one end of said inner member extending beyond the ends of the slots which are provided in the other end of said inner member, the inner member also having an internal rib located intermediate the ends thereof and beyond which the slots extend.

8. A two-piece coupling for frictionally gripping the ends of each of a pair of cylindrical objects, including: a female member; a male member in threaded engagement with said female member, said male member having an opening therethrough adapted to receive the ends of the cylindrical objects, and longitudinal slots extending therein from each end thereof, dividing each end into segments adapted to yield inwardly; and cooperating means carried by each of said members whereby the rotation of one of said members with respect to the other will force the said segments inwardly, thereby to engage the said cylindrical objects.

WILLIAM J. KATZBERG.